UNITED STATES PATENT OFFICE 2,260,871

SELF-FLOCCULATING DISPERSIBLE PIGMENTS AND PROCESS OF MAKING THE SAME

Roscoe H. Sawyer, Christiana, Del., assignor to E. I. du Pont de Nemours & Company, Wilmington, Del., a corporation of Delaware No Drawing. Application February 14, 1939, Serial No. 256,388

13 Claims. (Cl. 106—294)

This invention relates to the art of pigment materials. More particularly it relates to the art of water dispersible pigment materials. Still more particularly it relates to the preparation of pigment materials which disperse easily in water and which on subsequent standing are coagulated in water to form soft bulky flocculates.

Pigments which are characterized by a relatively low water absorption and which are easily dispersible in water have been produced in the past. Such water dispersible pigments possess technical advantages over non-water dispersible pigments. For example, they may be wet out with a much smaller amount of water to form free flowing pastes and/or suspensions. This permits a higher pigmentation of coating compositions, such as those used in paper coatings, which are prepared by wetting the pigment with sufficient water to produce a suspension of definite viscosity, and adding said suspension to a solution of such adhesives as casein, starch, and the like. Furthermore, less work is required to wet such water dispersible pigments out with water. In addition, the resultant suspensions are freer from gritty undispersed pigment aggregates. However, dispersions of such pigments in water media have the serious disadvantage that on standing they settle to a dense hard cake which can be reincorporated in the water media only with the greatest difficulty, if at all.

This invention has as an object the production of pigment materials which have greatly improved properties for use in aqueous media. A further object is the production of pigment materials which are characterized by relatively low water absorption characteristics and which are easily dispersible in water. A still further object is the production of aqueous suspensions of easily dispersible pigment materials which on standing yield soft bulky cakes of said pigment materials which are readily reincorporated in the water media by simple stirring. Additional objects will become apparent from an examination of the following description and claims.

These and other objects and advantages are attained according to the herein described invention which broadly comprises adding a substantially dry flocculating agent to a substantially dry water dispersible pigment, said flocculating agent being a metallic salt of a polyvalent metal and having a solubility in the range from about 0.003 gram equivalent of metallic ion to about 0.5 gram equivalent of metallic ion per liter of water, said flocculating agent being added to said water dispersible pigment as a dry powder in an amount corresponding to from about 0.0005 to about 0.035 gram equivalent metal per 100 grams pigment.

In a more restricted sense this invention comprises adding to a substantially dry water dispersible pigment a metallic salt having a solubility in the range of from about 0.01 to about 0.04 gram equivalent of metallic ion per liter of water, said metallic salt being selected from the class consisting of salts of aluminum, barium, bismuth, cadmium, calcium, chromium, cobalt, copper, iron, lead, magnesium, manganese, mercury, nickel, strontium, tin, vanadium, and zinc, and being added to said dry water dispersible pigment as a dry powder in an amount corresponding to from about 0.0008 to about 0.03 gram equivalent metal per 100 grams pigment.

The preferred embodiment of this invention comprises mixing substantially dry gypsum ($CaSO_4.2H_2O$), with a substantially dry water dispersible pigment, the particles of said gypsum having diameters in the range of from about 0.15 to about 0.3 millimeter, and said gypsum being added to said pigment in an amount corresponding to from about 0.001 to about 0.025 gram equivalent calcium per 100 grams pigment.

I have found it desirable in most instances to employ pigment materials to which have been added phosphate compounds, such as alkali metal hexametaphosphates and alkali metal pyrophosphates, preferably the sodium salts thereof.

For a better understanding of the characteristics of the self-flocculating water dispersible pigments of this invention, it will be necessary to explain the various terms used herein and the methods of testing employed.

WATER ABSORPTION

Water absorption is defined as the number of grams of water required per 100 grams of pigment to produce a free flowing paste. It is determined by the following procedure:

100 grams of the pigment is placed in a tin can 3¼" in diameter and 3½" high, e. g., a pint paint can with the top cut off. Water is added in small proportions while stirring with a spatula having a blade 4½" long and ⅞" wide with a square cornered end. The water is added from a 50 cubic centimeter burette. The first addition of water is thoroughly worked in with the spatula. The next additions are in 5 cubic centimeter portions with stirring after each addition. When the endpoint is almost reached, the water additions are decreased to 1 cubic centimeter portions and then to ½ cubic centimeter portions or less. Experience in the test will teach the proper amount to use for the final additions. Since variations from below 20 to above 400 have been found for various pigments, the proper number of 5 cubic centimeter portions to be added cannot be specified without knowing something concerning the history of the pigment under test. The final addition should produce a free flowing suspension which is free from lumps of pigment.

PIGMENT DISPERSION

To examine for dispersion (or absence of flocculates) I use a very simple test. A sample of the aqueous pigment suspension is placed in a glass tube having a diameter of from about 20 to about 30 millimeters and the tube is examined by aid of a high intensity microscope lamp and a 10 to 15 power magnifying glass. Flocculates can be observed under such conditions even when present to only a small extent.

Having explained the terms used herein I can now proceed with a detailed description of my invention.

The following examples are given for illustrative purposes and are not intended to place any restrictions or limitations on the herein described invention:

EXAMPLE I

A sample of normal lithopone having a water absorption of 164 was mixed with 0.5% by weight of sodium pyrophosphate. The water dispersible pigment thereby produced having a water absorption of 48 was mixed with an amount corresponding to 0.0058 gram equivalent calcium per 100 grams of lithopone, of a fraction of gypsum which had been passed through a No. 50 standard sieve but which would not pass through a No. 60 standard sieve, i. e., the particles of said gypsum had diameters in the range of from about 0.25 to about 0.3 millimeter. To 25 grams of the resultant pigment, which had a water absorption of 56, was added 75 grams of water and the mixture was stirred with a spatula. A well dispersed pigment suspension was obtained immediately which after 10 minutes standing flocculated and began to settle. After standing 2 days the flocculated pigment formed a soft cake, occupying 65% of the total volume of the aqueous suspension, which was readily reincorporated in the water media by simple stirring. On the other hand, when 25 grams of the aforementioned gypsum free sodium pyrophosphate treated water dispersible lithopone was stirred with 75 grams of water, the pigment dispersion, after 2 days standing, settled to a hard dense cake which occupied only 20% of the total volume, and which could not be reincorporated in the water media by simple stirring.

EXAMPLE II

A sample of a water dispersible titanium dioxide, obtained by dry milling calcined titanium dioxide, was mixed with gypsum in an amount corresponding to 0.0017 gram equivalent of calcium per 100 grams of titanium dioxide, the particles of said gypsum having diameters in the range of from 0.15 to 0.2 millimeter. To 15 grams of the resultant pigment was added 85 grams of water and the mixture was stirred with a spatula. The pigment showed excellent initial dispersion and was flocculated within 10 minutes. After 2 days standing the settled pigment occupied 76% of the volume, while in a control, identical except that it contained no gypsum, the pigment occupied only 5% of the volume. The soft bulky cake which was obtained with the novel dispersible self-flocculating titanium dioxide pigment of this invention was easily reincorporated in the aqueous media by simple stirring, whereas the hard dense cake produced by the prior art dispersible titanium dioxide pigment could not be reincorporated in the aqueous media by simple stirring.

EXAMPLE III

A sample of a blended titanium dioxide-barium sulfate pigment comprising 30% by weight of pigment titanium dioxide and 70% by weight of blanc fixe, which had been mixed with 0.4% by weight of sodium pyrophosphate, was mixed with a titanium dioxide-calcium sulfate pigment comprising 30% by weight pigment titanium dioxide and 70% by weight of anhydrite having a particle size of less than 0.07 millimeter in an amount corresponding to 0.02 gram equivalent calcium per 100 grams titanium dioxide-barium sulfate pigment. 25 grams of the resultant pigment was stirred with 75 grams water. The pigment showed excellent initial dispersion and was wetted readily by the water. It flocculated within 10 minutes and, after 2 days standing, formed a loose pigment cake, occupying 66% of the total volume, which was reincorporated in the aqueous media by simple stirring. A control, identical in all respects except that the titanium dioxide-barium sulfate pigment employed comprised no calcium sulfate, provided a pigment cake which occupied but 17% of the total volume and was so hard and dense that it could not be reincorporated in the aqueous media by stirring alone.

EXAMPLE IV

A sample of a water dispersible colored pigment, namely, lead chromate, was mixed with gypsum, in an amount corresponding to 0.0058 gram equivalent calcium per 100 grams colored pigment, the particles of said gypsum having diameters in the range of from 0.15 to 0.3 millimeter. 5 grams of the resultant pigment was stirred in 100 grams of water. Uniform dispersion of the pigment was had immediately and, at the end of 10 minutes standing, the pigment flocculated and settled out leaving a clear supernatant solution. At the end of 2 days standing the settled pigment was in the form of a soft cake, occupying 50% of the total volume, which was reincorporated in the aqueous media readily by simple stirring. On the other hand, under identical conditions the water dispersible colored pigment, without the added gypsum, produced a hard cake, occupying only 10% of the total volume, which could only be reincorporated in the aqueous media with the greatest difficulty.

EXAMPLE V

A sample of crushed rock gypsum,

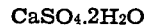

was separated into fractions of different particle size by screening through standard sieves Nos. 5, 8, 14, 30, 60, 100, 140, and 200 to provide gypsum samples, the particles of which had diameters in the range of from 4.00 to 2.38 millimeters, 2.38 to 1.41 millimeters, 1.41 to 0.59 millimeter, 0.59 to 0.25 millimeter, 0.25 to 0.149 millimeter, 0.149 to 0.105 millimeter, 0.105 to 0.074 millimeter, and less than 0.074 millimeter. Samples of a water dispersible lithopone comprising 0.5% sodium pyrophosphate were mixed with samples of the aforementioned screened rock gypsum fractions in an amount corresponding to 0.0093 gram equivalent calcium per 100 grams of lithopone. 10 gram portions of the several water dispersible self-flocculating lithopone pigments, thereby obtained, were added to 90 cubic centimeter portions of water and stirred therein with a high speed mechanical stirrer until flocculation and settling of the pigment occurred. In every case the pigment dispersed immediately in the aqueous media. However, as shown in the following table the pigment samples comprising the more finely divided rock gypsum flocculated after standing a much shorter interval of time than did those comprising the coarser rock gypsum.

Table I

| Gypsum particle size | Stirring time before pigment flocculated |
|---|---|
| *Millimeters* | *Minutes* |
| 4.00 to 2.38 | 72 |
| 2.38 to 1.41 | 33 |
| 1.41 to 0.59 | 19 |
| 0.59 to 0.25 | 11 |
| 0.25 to 0.149 | 6.5 |
| 0.149 to 0.105 | 2.5 |
| 0.105 to 0.074 | 1.5 |
| Less than 0.074 | 0.75 |

Example VI

Samples of a water dispersible titanium dioxide, which had been obtained by the dry milling of calcined titanium dioxide, were mixed with gypsum, the particles of which had diameters in the range of from 0.15 to 0.25 millimeter, in amounts corresponding to 0.0046, 0.0023, 0.0012, and 0.0006 gram equivalent calcium per 100 grams of titanium dioxide respectively. 10 gram portions were stirred under identical conditions into 90 cubic centimeter portions of water. The pigments dispersed immediately in the aqueous media and the resultant aqueous dispersions were stirred until flocculation of the pigment occurred. It was noted that the pigment treated with 0.0046 gram equivalent calcium coagulated after stirring 15 seconds, that treated with 0.0023 gram equivalent calcium coagulated after stirring 6 minutes, that treated with 0.0012 gram equivalent calcium coagulated after stirring 17 minutes, while that treated with only 0.0006 gram equivalent calcium did not flocculate until stirred for about 100 minutes.

Example VII

Samples of a water dispersible lithopone comprising 0.5% sodium pyrophosphate were mixed with magnesium oxalate ($MgC_2O_4.2H_2O$), magnesium carbonate ($MgCO_3.3H_2O$), magnesium tartrate (d) ($MgC_4H_4O_6.5H_2O$), magnesium sulfite $$(MgSO_3.6H_2O)$$

magnesium benzoate ($Mg(C_7H_5O_2)_2.3H_2O$), and magnesium formate ($Mg(CHO_2)_2.2H_2O$), respectively, the magnesium salts being added in amounts corresponding to 0.00446 gram equivalent magnesium per 100 grams pigment. 10 gram portions of the resultant pigments were stirred in 90 cubic centimeter portions of water in a mechanical mixer under identical conditions. In each case the pigment dispersed immediately in the aqueous media. The resultant aqueous dispersions were examined for pigment flocculation at the end of 2 minutes and at the end of 15 minutes stirring, with the results recorded in the following table:

Table II

| Mg. salt mixed with water dispersible lithopone | Solubility salt in gram equivalents mg. per liter water | Amount salt in gram equivalents mg. mixed with 100 g. lithopone | Appearance aqueous suspension after being stirred | |
|---|---|---|---|---|
| | | | 2 min. | 15 minutes |
| $MgC_2O_4.2H_2O$ | 0.009 | 0.00446 | Dispersed | Very slightly flocculated. |
| $MgCO_3.3H_2O$ | 0.022 | 0.00446 | do | Slightly flocculated. |
| $MgC_4H_4O_6.5H_2O$ | 0.061 | 0.00446 | do | Flocculated. |
| $MgSO_3.6H_2O$ | 0.118 | 0.00446 | Flocculated | Do. |
| $Mg(C_7H_5O_2)_2.3H_2O$ | 0.192 | 0.00446 | do | Do. |
| $Mg(CHO_2)_2.2H_2O$ | 0.512 | 0.00446 | do | Do. |

It will be noted that flocculation was effected more slowly in the case of the pigment treated with the less soluble magnesium compounds, such as magnesium oxalate, than with those treated with the more soluble magnesium compounds, such as magnesium formate.

Example VIII

A sample of a water dispersible lithopone comprising 0.5% sodium pyrophosphate was mixed with gypsum in an amount corresponding to 0.0093 gram equivalent calcium per 100 grams of lithopone, the particles of said gypsum having diameters in the range of from 0.15 to 0.25 millimeter. One 25 gram sample of the resultant novel water dispersible self-flocculating lithopone pigment of this invention was stirred into 250 cc. of water by hand with a spatula. Another 25 gram sample of said pigment was stirred into 250 cc. water by rapid agitation in a mechanical mixer. In both instances immediate dispersion of the pigment in the aqueous media was effected. However, the pigment dispersion which was agitated rapidly in the mechanical mixer, flocculated within 4½ minutes, whereas that stirred slowly with a spatula did not flocculate until 32 minutes time had elapsed.

It is to be understood that the hereinbefore disclosed specific embodiments of my invention may be subject to variation and modification without departing from the scope of this invention. For instance, while I prefer to employ gypsum in the form of a substantially dry powder as the flocculating agent in the production of my novel water dispersible self-flocculating pigments, it is to be understood that the use of salts of polyvalent metals having solubilities in the range of from about 0.003 to about 0.5 gram equivalent of metallic ion per liter of water is contemplated as within the scope of this invention. Thus, this invention comprises the employment of metallic salts of aluminum, barium, bismuth, cadmium, calcium, chromium, cobalt, copper, iron, lead, magnesium, manganese, mercury, nickel, strontium, tin, vanadium, and zinc, having solubilities in the range of from about 0.01 to about 0.04 gram equivalent of metallic ion per liter of water. Examples of flocculating agents particularly suitable for use in my invention include Barium bromate, $Ba(BrO_3)_2.H_2O$
Barium ferrocyanide, $Ba_2Fe(CN)_6.6H_2O$
Barium fluoride, $BaF_2$
Barium thiosulfate, $BaS_2O_3$
Barium malonate, $BaC_3H_2O_4.H_2O$
Barium succinate, $BaC_4H_4O_4$
Cadmium cinnamate, $(C_2H_5CHCHCOO)_2Cd$
Calcium metaborate, $Ca(BO_2)_2.6H_2O$
Syngenite, $CaK_2(SO_4)_2.H_2O$
Anhydrite, $CaSO_4$
Gypsum, $CaSO_4.2H_2O$
Scheelite, $CaWO_4$
Calcium cinnamate, $Ca(C_9H_7O_2)_2.3H_2O$
Racemic calcium malate, $CaC_4H_4O_5.3H_2O$
Chromium hexaurea fluosilicate,
  $[Cr(OCN_2H_4)_6]_2(SiF_6)_3.3H_2O$
Cobalt iodate, $Co(IO_3)_2$
Dipropyltin difluoride, $(C_3H_7)_2SnF_2$
Lead bromide, $PbBr_2$
Magnesium carbonate, $MgCO_3.3H_2O$
Mercuric bromide, $HgBr_2$
Strontium orthoarsenate, $SrHAsO_4.H_2O$
Strontium chromate, $SrCrO_4$
Zinc iodate, $Zn(IO_3)_2.2H_2O$
Zinc sulfite, $ZnSO_3.2½H_2O$ Examples of other flocculating agents contemplated for use in this invention include Barium arsenate, $Ba_3(AsO_4)_2$
Barium citrate, $Ba(C_6H_5O_7)_2.7H_2O$
Barium malate, $BaC_4H_4O_5$
Cadmium tungstate, $CdWO_4$
Cadmium fumarate, $Cd_2C_4H_2O_4$
Cadium malate, $Cd_2C_4H_2O_4.2H_2O$
Calcium metaborate, $Ca(BO_2)_2.2H_2O$
Calcium hydroxide, $Ca(OH)_2$
Lautarite, $Ca(IO_3)_2$
Calcium iodate, $Ca(IO_3)_2.6H_2O$
Optically active calcium malate, $CaC_4H_4O_5.2H_2O$
Calcium malonate, $CaC_3H_2O_4.4H_2O$
Calcium succinate, $CaC_4H_4O_4.3H_2O$
Cobalt citrate, $Co(C_6H_5O_2)_2.2H_2O$
Ferrous lactate, $Fe(C_3H_5O_3)_2.3H_2O$
Ferrous tartrate, $FeC_4H_4O_6$
Lead bromate, $Pb(BrO_3)_2.H_2O$
Lead chloride, $PbCl_2$
Lead fluoride, $PbF_2$
Lead iodide, $PbI_2$
Lead thiocyanate, $Pb(CNS)_2$
Lead formate, $Pb(CHO_2)_2$
Magnesium ammonium arsenate,
  $MgNH_4AsO_4.6H_2O$
Magnesium carbonate, $MgCO_3$
Basic magnesium carbonate,
  $3MgCO_3.Mg(OH)_2.3H_2O$
Magnesium sulfite, $MgSO_3.6H_2O$
Magnesium oxalate, $MgC_2O_4.2H_2O$
Magnesium tartrate $(d)$, $MgC_4H_4O_6.5H_2O$
Mercuric bromate, $Hg(BrO_3)_2.2H_2O$
Mercuric thiocyanate, $Hg(CNS)_2$
Stannous iodide, $SnI_2$
Strontium hydroxide, $Sr(OH)_2$
Strontium tungstate, $SrWO_4$
Strontium tartrate, $SrC_4H_4O_6.4H_2O$
Zinc fluoride, $ZnF_2.4H_2O$
Zinc lactate, $Zn(C_3H_5O_3)_2.3H_2O$ The optimum particle size range of the coagulating agents employed can best be learned by experimental trial and will depend upon the type and previous history of the pigment being treated, the type and solubility of the flocculating agent employed, the amount of agent mixed with the pigment, and the use requirements of the finished pigment. Rapid flocculation of the dispersed aqueous pigment suspension is obtained when the particles of said flocculating agent have diameters of less than about 0.007 millimeter. Flocculation is effected more slowly when the particles of said flocculating agent have diameters of about 4 millimeters or more. I have found it desirable to employ flocculating agents having diameters in the range of from about 0.07 to about 2.5 millimeters, although, as stated herein, I prefer to employ flocculating agents whose particles have diameters in the range of from about 0.15 to about 0.3 millimeter.

The optimum amount of coagulating agent added to the water dispersible pigment can best be learned by experimental trial and will depend upon the type and previous history of the pigment being treated, the type and previous history of the flocculating agent employed, and the use requirements of the finished pigment. In the case of water dispersible lithopone and dry colors optimum results are obtained when one employs flocculating agent in an amount corresponding to from about 0.007 to about 0.01 gram equivalent of metallic ion per 100 grams pigment.

In the case of water dispersible pigments such as titanium dioxide-barium sulfate pigments comprising from about 20% to about 40% titanium dioxide, and about 80% to about 60% barium sulfate optimum results are obtained when there is added flocculating agents in an amount corresponding to from about 0.017 to about 0.023 gram equivalent metallic ion per 100 grams pigment.

In the case of such water dispersible pigments as water dispersible titanium dioxide obtained by simple dry milling of calcined $CaSA_4$ and $SrSO_4$ free titanium dioxide optimum results are obtained when flocculating agents are added in an amount corresponding to from about 0.001 to about 0.0025 gram equivalent metallic ion per 100 grams pigment.

In the practice of my invention, the herein described flocculating agents must be added in a substantially dry condition to substantially dry water dispersible pigment materials. Furthermore, uniform distribution of said flocculating agents through said water dispersible pigments must be effected. Said uniform distribution may be obtained by mixing said flocculating agents and said pigments in any of the dry powder mixing devices well known to those skilled in the art, such as, for example, rotating pan mixers, ribbon or double-helical mixers, dough mixers, tumbling barrels, rake mixers, and the like. However, it is to be understood that it is not preferred to effect mixing in dry milling equipment, such as pulverizing and disintegrating machines, because of the effect on the particle size of the added coagulating agent.

Furthermore, it is essential in my novel process that the water dispersible flocculating agent treated product thereof must not be calcined, i. e., it must not be heated to a temperature substantially higher than about 400° C.

While the invention has been described with particular reference to the treatment of lithopone, titanium dioxide-barium sulfate pigments comprising 30 parts by weight titanium dioxide and 70 parts by weight barium sulfate, lead chromate pigments and titanium dioxide, the treatment of other types of water dispersible pigments is within the scope of this invention. Accordingly, the term "water dispersible pigment material," as employed herein and in the appended claims, includes not only the aforementioned water dispersible pigments but also all other pigment materials which disperse in water upon being stirred therein. Examples of such pigments include water dispersible white pigment materials such as water dispersible titanium dioxide, water dispersible extended titanium dioxide pigments, water dispersible titanates of divalent metals, water dispersible zirconium oxide, water dispersible zirconium silicate, water dispersible lithopone, water dispersible zinc sulfide, water dispersible zinc oxide, water dispersible antimony oxide, and the like, and such water dispersible pigment extender materials such as water dispersible magnesium silicate, water dispersible clay, water dispersible barium sulfate, water dispersible calcium carbonate, water dispersible barium carbonate, water dispersible silica, water dispersible aluminum silicate, water dispersible aluminum oxide, and the like, and such water dispersible colored pigment materials as water dispersible ultramarine blue, water dispersible chrome yellow, water dispersible basic zinc chromate, water dispersible chrome orange, water dispersible barium chromate, water dispersible iron blue, water dispersible earth colors such as iron oxide, water dispersible insoluble dyestuffs such as para red and toluidine red, water dispersible acid dyestuffs such as pigment scarlet and lithol red, water dispersible extended colors, and the like.

My process possesses advantages not previously combined in a single process. Furthermore, the products of my process possess advantages not previously combined in a pigment material. For instance, my novel process permits the manufacture of pigment materials which may be wetted out by, and incorporated in, a limited amount of water to provide a well dispersed aqueous pigment suspension. Furthermore, the aqueous pigment dispersion obtained with the novel pigment materials of this invention flocculate after standing a predetermined interval of time, and, on settling, provide a soft bulky pigment cake which may be reincorporated in the aqueous media by simple stirring. On the other hand, prior art water dispersible pigments, while they may be wetted out with, and incorporated in, a limited amount of water, to provide uniform aqueous pigment dispersions, they provide pigment dispersions which on standing settle out as dense hard cakes which may be reincorporated in the aqueous media only with the greatest difficulty, if at all. Moreover, prior art pigments, such as precipitated titanium dioxide obtained by wet milling calcined titanium dioxide, and thereafter coagulating and precipitating the resultant wet milled pigment, while they do not form hard dense cakes when incorporated in aqueous media, they do have high water absorption characteristics and may only be wetted out and incorporated in a large amount of water to provide undesirably dilute aqueous pigment suspensions containing objectionable amounts of gritty, undispersed pigment aggregates.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for producing improved pigment materials which disperse easily in water and which on subsequent standing are coagulated in water to form soft bulky flocculates the steps which comprise adding a substantially dry metallic salt of a polyvalent metal to a substantially dry water dispersible pigment, said salt having a solubility in the range of from about 0.003 gram equivalent to about 0.5 gram equivalent of metallic ion per liter of water, and thereafter mixing, while the aforementioned pigment and salt are still in the dry state, to obtain uniform distribution.

2. In a process for producing improved pigment materials which disperse easily in water and which on subsequent standing are coagulated in water to form soft bulky flocculates the steps which comprise adding between about 0.0005 and about 0.035 gram equivalent metal per 100 grams of pigment, of a substantially dry metallic salt of a polyvalent metal having a solubility in the range of from about 0.01 to about 0.04 gram equivalent of metallic ion per liter of water, to a substantially dry water dispersible pigment and thereafter mixing, while the aforementioned pigment and salt are in the dry state, to obtain uniform distribution.

3. In a process for producing improved pigment materials which disperse easily in water and which on subsequent standing are coagulated in water to form soft bulky flocculates the steps which comprise adding between about 0.0008 to about 0.03 gram equivalent metal per 100 grams of pigment, of a substantially dry metallic salt of a polyvalent metal, the particles of said salt having a diameter in the range of from about 0.007 millimeter to about 4 millimeters and a solubility in the range of from about 0.01 to about 0.04 gram equivalent of metallic ion per liter of water, to a substantially dry water dispersible pigment, and thereafter mixing, while the aforementioned pigment and salt are still in the dry state, to obtain uniform distribution.

4. In a process for producing improved pigment materials which disperse easily in water and which on subsequent standing are coagulated in water to form soft bulky flocculates the steps which comprise adding between about 0.0008 and about 0.03 gram equivalent metal per 100 grams of pigment, of a substantially dry metallic salt, of a polyvalent metal, the particles of said salt having a diameter in the range of from about 0.07 millimeter and about 2.5 millimeters, and a solubility in the range of from about 0.01 to about 0.04 gram equivalent of metallic ion per liter of water, to a substantially dry water dispersible pigment, and thereafter mixing, while the aforementioned pigment and salt are still in the dry state, to obtain uniform distribution.

5. In a process for producing improved pigment materials which disperse easily in water and which on subsequent standing are coagulated in water to form soft bulky flocculates the steps which comprise adding between about 0.0005 and about 0.035 gram equivalent metal to 100 grams of pigment, of gypsum to a substantially dry water dispersible pigment, and thereafter mixing, while the aforementioned pigment and gypsum are still in the dry state, to obtain uniform distribution.

6. In a process for producing improved pigment materials which disperse easily in water and which on subsequent standing are coagulated in water to form soft bulky flocculates the steps which comprise adding between about 0.0005 and about 0.035 gram equivalent metal per 100 grams of pigment, of gypsum, the particle size of said gypsum having a diameter in the range of from about 0.007 millimeter to about 4 millimeters, to a subtantially dry water dispersible pigment, and thereafter mixing, while the aforementioned pigment and gypsum are still in the dry state, to obtain uniform distribution.

7. In a process for producing improved pigment materials which disperse easily in water and which on subsequent standing are coagulated in water to form soft bulky flocculates the steps which comprise adding between about 0.0005 and about 0.035 gram equivalent metal per 100 grams of pigment, of gypsum, the particle size of said gypsum having a diameter in the range of from about 0.007 millimeter to about 4 millimeters, to a subtantially dry water dispersible lithopone pigment, and thereafter mixing, while the aforementioned pigment and gypsum are still in the dry state, to obtain uniform distribution.

8. In a process for producing improved pigment materials which disperse easily in water and which on subsequent standing are coagulated in water to form soft bulky flocculates the steps which comprise adding between about 0.0005 and about 0.035 gram equivalent metal per 100 grams pigment, of gypsum, the particle size of said gypsum having a diameter in the range of from about 0.007 millimeter to about 4 millimeters, to a substantially dry water dispersible titanium pigment, and thereafter mixing, while the aforementioned pigment and gypsum are still in the dry state, to obtain uniform distribution.

9. An improved pigment which disperses easily in water and which on subsequent standing is coagulated in water to form soft bulky flocculates which comprises a water dispersible pigment and from about .0005 to about .035 gram equivalents of a salt of a polyvalent metal having a solubility in the range of from about .003 to about 0.5 gram equivalents per liter, the water dispersible pigment and salt of a polyvalent metal having been admixed in a substantially dry state.

10. In a process for producing improved pigment materials which disperse easily in water and which on subsequent standing are coagulated in water to form soft bulky flocculates the steps which comprise adding a substantially dry metallic salt of a polyvalent metal to a substantially dry water dispersible extended titanium dioxide pigment, said salt having a solubility in the range of from about 0.003 gram equivalent to about 0.5 gram equivalent of metallic ion per liter of water, and thereafter mixing, while the aforementioned pigment and salt are still in the dry state to obtain uniform distribution.

11. In a process for producing improved pigment materials which disperse easily in water and which on subsequent standing are coagulated in water to form soft bulky flocculates the steps which comprise adding a substantially dry metallic salt of a polyvalent metal to a substantially dry water dispersible lithopone pigment, said salt having a solubility in the range of from about 0.003 gram equivalent to about 0.5 gram equivalent of metallic ion per liter of water, and thereafter mixing, while the aforementioned pigment and salt are still in the dry state to obtain uniform distribution.

12. An improved pigment which disperses easily in water and which on subsequent standing is coagulated in water to form soft bulky flocculates which comprises a water dispersible extended titanium dioxide pigment and from about .0005 to about .035 gram equivalents of a salt of a polyvalent metal having a solubility in the range of from about .003 to about 0.5 gram equivalents per liter, the water dispersible pigment and salt of a polyvalent metal having been admixed in a substantially dry state.

13. An improved pigment which disperses easily in water and which on subsequent standing is coagulated in water to form soft bulky flocculates which comprises a water dispersible lithopone pigment and from about .0005 to about .035 gram equivalents of a salt of a polyvalent metal having a solubility in the range of from about .003 to about 0.5 gram equivalents per liter, the water dispersible pigment and salt of a polyvalent metal having been admixed in a substantially dry state.

ROSCOE H. SAWYER.